United States Patent
Park et al.

(10) Patent No.: US 10,153,624 B2
(45) Date of Patent: Dec. 11, 2018

(54) CONTAINER FOR ENERGY STORAGE APPARATUS

(71) Applicant: LG CHEM, LTD., Seoul (KR)

(72) Inventors: Chanmin Park, Daejeon (KR); Taeshin Cho, Daejeon (KR); Donghoe Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/507,412

(22) PCT Filed: Nov. 17, 2015

(86) PCT No.: PCT/KR2015/012361
§ 371 (c)(1),
(2) Date: Feb. 28, 2017

(87) PCT Pub. No.: WO2016/080741
PCT Pub. Date: May 26, 2016

(65) Prior Publication Data
US 2017/0288378 A1    Oct. 5, 2017

(30) Foreign Application Priority Data
Nov. 19, 2014 (KR) .................. 10-2014-0161537

(51) Int. Cl.
*H02B 1/34* (2006.01)
*H01M 2/10* (2006.01)
*H02B 1/01* (2006.01)

(52) U.S. Cl.
CPC ............... *H02B 1/34* (2013.01); *H01M 2/10* (2013.01); *H01M 2/1077* (2013.01);
(Continued)

(58) Field of Classification Search
CPC ............ H02B 1/34; H02B 1/012; H02B 1/013
See application file for complete search history.

(56) References Cited

U.S. PATENT DOCUMENTS 4,073,556 A     2/1978  Wilson, Jr.
4,928,834 A  *  5/1990  Neiman ............... A47B 57/402
                                                211/191

(Continued)

FOREIGN PATENT DOCUMENTS

JP    2015-230863 A    12/2015
KR    10-2011-0072271 A    6/2011
(Continued)

OTHER PUBLICATIONS

International Search Report, issued in PCT/KR2015/012361 (PCT/ISA/210), dated Mar. 10, 2016.
(Continued)

*Primary Examiner* — Hoa C Nguyen
*Assistant Examiner* — Keith Depew
(74) *Attorney, Agent, or Firm* — Birch, Stewart, Kolasch & Birch, LLP

(57) ABSTRACT

The present invention relates to a container for an energy storage apparatus, the container including: a container main body which defines an internal space finished by an upper plate, a lower plate, and a plurality of sidewalls; a first support frame which is installed on the upper plate of the container main body; a second support frame which is installed on the lower plate of the container main body; and one or more vertical frames which are coupled to the first and second support frames in a vertical direction, and configure vertical frames for a typically used battery rack.

13 Claims, 2 Drawing Sheets

(52) U.S. Cl.
CPC .............. *H02B 1/012* (2013.01); *H02B 1/013* (2013.01); *H01M 2220/10* (2013.01)

(56) References Cited

U.S. PATENT DOCUMENTS

| | | | | |
|---|---|---|---|---|
| 6,190,081 | B1* | 2/2001 | Besserer | H02B 1/32 |
| | | | | 211/183 |
| 6,202,570 | B1* | 3/2001 | Kurtsman | H02B 1/34 |
| | | | | 108/108 |
| 6,475,659 | B1* | 11/2002 | Heimer | H01M 2/0262 |
| | | | | 429/130 |
| 6,520,345 | B1* | 2/2003 | Marovic | H02B 1/01 |
| | | | | 211/183 |
| 6,920,831 | B2* | 7/2005 | Lin | A47B 57/40 |
| | | | | 108/107 |
| 8,900,737 | B2* | 12/2014 | Kim | H01M 2/1016 |
| | | | | 429/123 |
| 9,101,216 | B2* | 8/2015 | Fitzgerald | A47B 57/50 |
| 9,627,860 | B2* | 4/2017 | Proserpio | H02B 1/012 |
| 2002/0162809 | A1* | 11/2002 | Hartel | H05K 7/183 |
| | | | | 211/26 |
| 2002/0179552 | A1* | 12/2002 | Marraffa | H01M 2/1077 |
| | | | | 211/49.1 |
| 2004/0035807 | A1 | 2/2004 | Marraffa | |
| 2004/0086780 | A1* | 5/2004 | Ebermann | H01M 2/1077 |
| | | | | 429/120 |
| 2005/0281002 | A1* | 12/2005 | Miller | H01M 2/1077 |
| | | | | 361/716 |
| 2006/0028171 | A1* | 2/2006 | Marraffa | H01M 2/1077 |
| | | | | 320/107 |
| 2006/0152906 | A1* | 7/2006 | Miller | H01M 2/1077 |
| | | | | 361/716 |
| 2007/0178369 | A1 | 8/2007 | Conrardy et al. | |
| 2011/0151308 | A1 | 6/2011 | Yoon | |
| 2013/0017428 | A1* | 1/2013 | Han | H01M 2/1077 |
| | | | | 429/99 |
| 2013/0313953 | A1 | 11/2013 | Lee et al. | |
| 2014/0017531 | A1* | 1/2014 | Uehara | H01M 2/1077 |
| | | | | 429/82 |
| 2015/0257532 | A1* | 9/2015 | Corbo | A47B 47/027 |
| | | | | 211/26 |

FOREIGN PATENT DOCUMENTS

| | | |
|---|---|---|
| KR | 10-2012-0120673 A | 11/2012 |
| KR | 10-2013-0027993 A | 3/2013 |

OTHER PUBLICATIONS

Written Opinion of the International Searching Authority, issued in PCT/KR2015/012361 (PCT/ISA/237), dated Mar. 10, 2016.
Extended European Search Report dated Mar. 12, 2018 for Application No. 15861759.7.

* cited by examiner

CONTAINER FOR ENERGY STORAGE APPARATUS

TECHNICAL FIELD

This application claims priority to and the benefit of Korean Patent Application No. 10-2014-0161537 filed on Nov. 19, 2014, the entire contents of which are incorporated herein by reference.

The present invention relates to a container for an energy storage apparatus, and more particularly, to a container for an energy storage apparatus, in which support frames are installed in pairs corresponding to an upper plate and a lower plate of the container which define an internal space, and one or more vertical frames are coupled to the support frames, so that vertical frames for a typically used battery rack are configured, and the support frames and the vertical frames are integrally coupled.

BACKGROUND ART

Electric power consumption is being rapidly increased due to global warming and industrial development, and thus an energy storage apparatus (energy storage system; ESS) has been utilized as an efficient alternative in order to satisfy demands for electric power which are increased.

The energy storage apparatus serves to store excessively produced electric power, and transmit the electric power when electric power is insufficient, and the energy storage apparatus may be installed and managed in power generation systems and power transmission and distribution systems of electric power system, and consumer houses, and utilized for various functions such as new regenerative energy output stabilization and an emergency power source.

In this case, the energy storage apparatus stores several to several hundreds of battery modules in order to stably store high capacity energy, and the battery modules are stacked on a battery rack in order to minimize a spatial requirement.

In general, because there is a limitation to a size of a container that stores the energy storage apparatus, it is necessary to increase spatial utilization of the battery rack for an efficient spatial use.

In the case of a container for an energy storage apparatus in the related art, support frames are made in the container, and the battery rack in the form of a finished product is coupled to the container, and as a result, a lower end of the battery rack and a side frame are overlapped during this process, so that a space is unnecessarily wasted.

DETAILED DESCRIPTION OF INVENTION

Technical Problem

The present invention has been made in an effort to solve the problem of the container for an energy storage apparatus in the related art, and an object of the present invention is to provide a container for an energy storage apparatus, which is capable of improving space utilization by integrally coupling support frames installed on an upper plate and a lower plate of the container, and one or more vertical frames.

Technical Solution

An exemplary embodiment of the present invention provides a container for an energy storage apparatus, the container including: a container main body which defines an internal space finished by an upper plate, a lower plate, and one or more sidewalls; support frames which are installed on the upper plate and the lower plate of the container main body; and one or more vertical frames which are coupled to the support frames in a vertical direction, and configure vertical frames for a typically used battery rack.

In the exemplary embodiment, the support frames may include a first support frame which is installed on the upper plate of the container main body, and a second support frame which is installed on the lower plate of the container main body.

In the exemplary embodiment, the support frame may further include one or more first coupling grooves so as to be coupled to the vertical frame.

In the exemplary embodiment, the vertical frame may provide support portions for supporting a battery.

In the exemplary embodiment, the vertical frame may include one or more second coupling grooves so as to be coupled to the support portions.

In the exemplary embodiment, the container for an energy storage apparatus may further include one or more fixing members for fixing a coupling of the support frame and the vertical frame.

Advantageous Effects

An aspect of the present invention may provide a container for an energy storage apparatus, in which support frames are installed in pairs corresponding to an upper plate and a lower plate of the container which define an internal space, and one or more vertical frames are coupled to the support frames, so that vertical frames for a typically used battery rack are configured, and the support frames and the vertical frames are integrally coupled, thereby improving spatial utilization.

Therefore, by reducing the use of unnecessary members such as overlapping frames, economic feasibility may be improved.

In addition, a space in the container is saved, and a relatively larger passageway so as for a user to move and carry a battery may be ensured. Furthermore, since a larger passageway is ensured, it is possible to prevent a safety accident that may occur while the user moves and carries the battery.

BEST MODE

Figure 1:
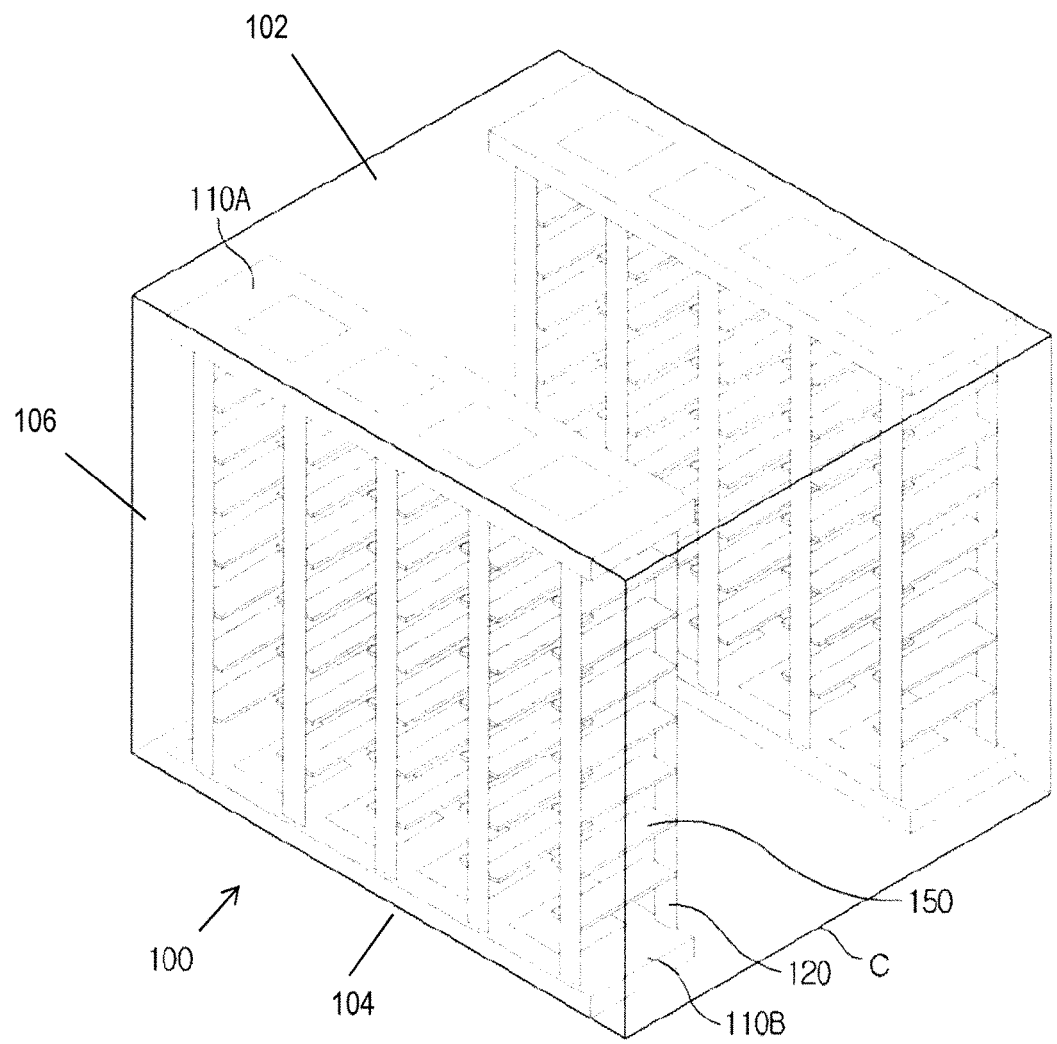
FIG. 1 is a view schematically illustrating a container for an energy storage apparatus according to an exemplary embodiment of the present invention.

Hereinafter, the present invention will be described in detail with reference to the accompanying drawings. Here, repeated descriptions, and detailed descriptions of publicly known functions and configurations will be omitted so as to avoid unnecessarily obscuring the subject matter of the present invention. The exemplary embodiments of the present invention are provided to more completely explain the present invention to a person with ordinary skill in the art. Therefore, shapes and sizes of elements illustrated in the drawings may be exaggerated for a more apparent description.

Unless explicitly described to the contrary, the word "comprise" or "include" and variations, such as "comprises", "comprising", "includes" or "including", will be understood to imply the inclusion of stated constituent elements but not the exclusion of any other constituent elements.

Figure 2:
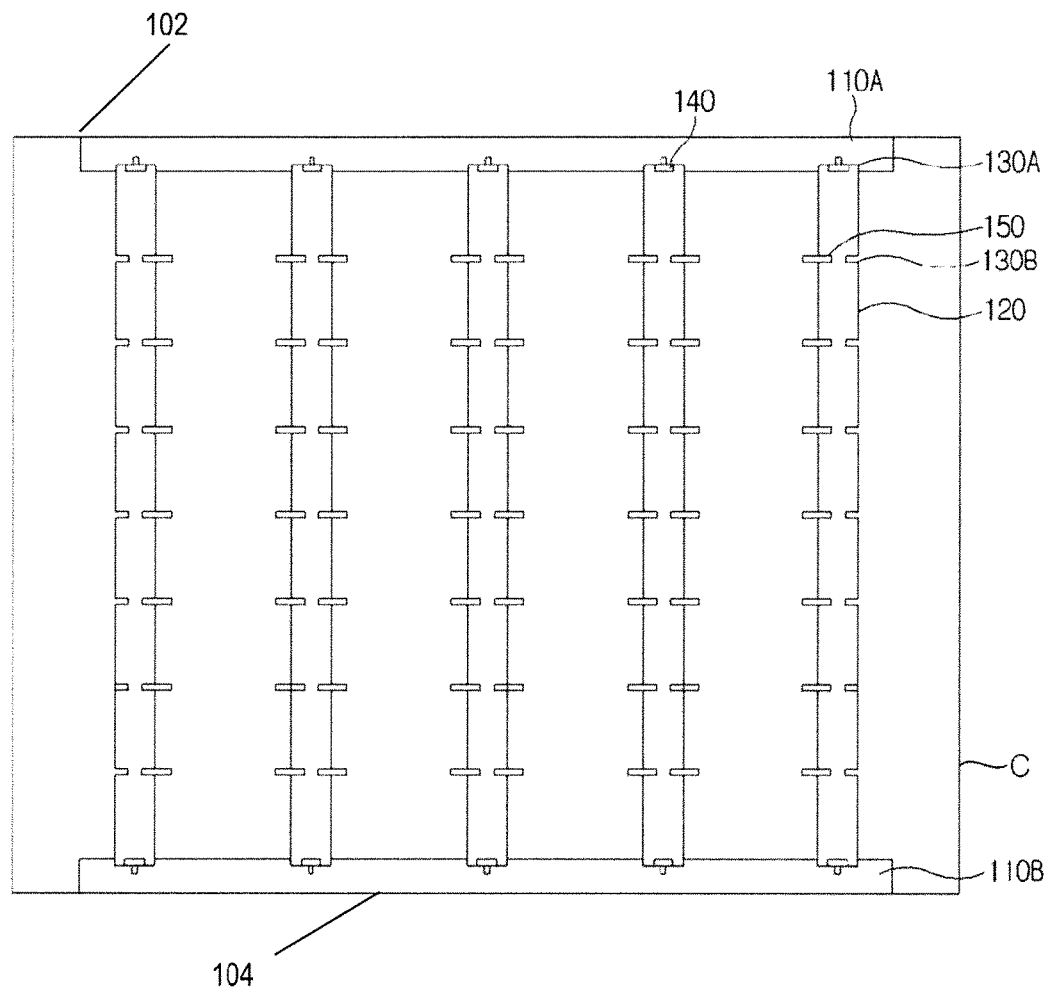
FIG. 2 is a cross-sectional view schematically illustrating the container for an energy storage apparatus according to the exemplary embodiment of the present invention.

FIG. 1 is a view schematically illustrating a container 100 for an energy storage apparatus according to an exemplary embodiment of the present invention, and FIG. 2 is a cross-sectional view schematically illustrating the container 100 for an energy storage apparatus according to the exemplary embodiment of the present invention.

Referring to FIGS. 1 and 2, the container 100 for an energy storage apparatus according to the exemplary embodiment of the present invention may include a container main body C, a first support frame 110A, a second support frame 110B, and vertical frames 120.

It is noted that the container 100 for an energy storage apparatus illustrated in FIGS. 1 and 2 will be described according to an exemplary embodiment, but the constituent elements are not limited to the exemplary embodiment illustrated in FIGS. 1 and 2, and some constituent elements may be added, changed, or deleted as necessary.

The container main body C defines an internal space finished by an upper plate 102, a lower plate 104, and one or more sidewalls 106, and serves to store a battery for an energy storage device or an energy storage apparatus (Energy Storage System; ESS).

In FIG. 1, the container main body C of the container 100 for an energy storage apparatus according to the exemplary embodiment of the present invention is illustrated as a rectangular parallelepiped shape which is closed at six sides, but it is noted that the shape and the size thereof are not limited to the exemplary embodiment, and an upper side or a lateral side of the container main body C may be opened as necessary.

The support frames 110A and 110B include the first support frame 110A which is installed on the upper plate of the container main body C, and the second support frame 110B which is installed on the lower plate of the container main body C, and the support frames 110A and 110B may serve to support and fix the vertical frames 120 to be described below.

In this case, the first support frame 110A and the second support frame 110B are configured as a pair of frames that face each other, and the first support frame 110A and the second support frame 110B may correspond to each other in terms of configuration and size.

The support frames 110A and 110B may include one or more first coupling grooves 130A which are recessed inward.

The first coupling grooves 130A may define internal spaces so that the vertical frames 120 to be described below may be inserted into or coupled to the first coupling grooves 130A, and serve to prevent the vertical frames 120 from moving in a horizontal direction when the vertical frames 120 are coupled.

In this case, the first coupling grooves 130A are formed in the first support frame 110A and the second support frame 110B in pairs so as to face each other, and may have corresponding depths and areas.

Here, it is noted that the support frames 110A and 110B, and the first coupling grooves 130A are merely an exemplary embodiment, and the present invention is not limited thereto. Meanwhile, it is noted that the support frames 110A and 110B may be formed integrally with the container main body C.

The vertical frame 120 is integrally coupled to the first support frame 110A and the second support frame 110B, and may serve as vertical frames for a typically used battery rack (i.e., outer or inner vertical frames for a battery rack in the related art).

Here, both ends of the vertical frame 120 may be configured in a shape conforming to the shape of the first coupling grooves 130A, and a length of the vertical frame 120 may correspond to a distance between the first coupling groove 130A provided in the first support frame 110A and the first coupling groove 130A provided in the second support frame 110B.

The vertical frame 120 may include support portions 150, and one or more second coupling grooves 130B.

The support portion 150 is configured as a panel which is provided inside the vertical frame 120 and has a predetermined thickness, and may serve to support and fix the accommodated battery.

Here, the support portion 150 may be inserted into the second coupling groove 130B to be described below, and may be detached or attached in accordance with a battery capacity.

The second coupling groove 130B is a groove recessed into the vertical frame 120, and the second coupling grooves 130B are provided at predetermined intervals, and may serve to provide spaces into which the support portions 150 are inserted.

In this case, the second coupling grooves 130B may be provided in pairs so as to be opposite to each other in terms of opening directions based on a central axis of the vertical frame 120.

Likewise, it is noted that the support portion 150 and the second coupling groove 130B are merely an exemplary embodiment, and the present invention is not limited thereto.

In addition to the constituent elements, the container 100 for an energy storage apparatus may further include one or more fixing members 140.

The fixing members 140 serve to securely fix the vertical frame 120 so as to prevent the vertical frame 120 from being withdrawn from the first coupling grooves 130A of the support frames 110A and 110B.

In this case, the fixing members 140 may be configured as a nut, and a bolt which is fastened by penetrating the vertical frame 120 and the support frames 110A and 110B.

With the aforementioned configuration, the container 100 for an energy storage apparatus according to the exemplary embodiment of the present invention is configured as a shape of a battery rack by integrally coupling the container main body C, the support frames 110A and 110B, and the vertical frame 120, and as a result, it is possible to reduce an unnecessary duplicated use of frames and improve economical and spatial utilization.

In addition, a space in the container is saved, and a relatively larger passageway so as for a user to move and carry a battery is ensured, and as a result, there is an effect of improving safety.

While the specific exemplary embodiment of the present invention has been illustrated and described above, it is obvious to those skilled in the art that the technical spirit of the present invention is not limited to the attached drawings and the aforementioned descriptions, and the exemplary embodiment may be variously modified without departing from the technical spirit of the present invention, and it should be construed that the modified forms are included in the claims of the present invention without departing from the technical spirit of the present invention.

The invention claimed is:

1. A container for an energy storage apparatus, the container comprising:
   a container main body which defines an internal space finished by an upper plate, a lower plate, and one or more sidewalls;
   support frames which are installed on the upper plate and the lower plate of the container main body;
   a first plurality of pairs of vertical frames coupled to the support frames in a vertical direction; and
   a first plurality of support portions extending between each of the first plurality of pairs of vertical frames, each pair of the first plurality of pairs of vertical frames having a plurality of support portions spaced from one another in the vertical direction,
   wherein the support frames include a first support frame which is installed on the upper plate of the container main body, and a second support frame which is installed on the lower plate of the container main body, the plurality of pairs of vertical frames extending between a lower surface of the second support frame and an upper surface of the first support frame, and
   wherein the support frames directly couple the container main body and the vertical frame.

2. The container of claim 1, wherein the support frames include one or more first coupling grooves so as to be coupled to the first plurality of pairs of vertical frames.

3. The container of claim 2, further comprising:
   one or more fixing members for fixing a coupling of the support frames and the first plurality of pairs of vertical frames.

4. The container of claim 1, wherein the first plurality of pairs of vertical frames includes one or more second coupling grooves so as to be coupled to the support portions.

5. The container of claim 1, further comprising:
   a plurality of grooves in a lower surface of the first support frame,
   wherein an upper edge of each of the first plurality of pairs of vertical frames fits within one of the grooves.

6. The container of claim 1, further comprising:
   a third support frame installed on the upper plate of the container main body and a fourth support frame installed on the lower plate of the container main body;
   a second plurality of pairs of vertical frames coupled to the third support frame and the fourth support frame; and
   a second plurality of support portions extending between each of the second plurality of pairs of vertical frames, each pair of the second plurality of pairs of vertical frames having a plurality of support portions spaced from one another in the vertical direction.

7. The container of claim 6, wherein the first support frame and second support frame form a first row and the third support frame and fourth support frame form a second row.

8. The container of claim 7, wherein the first row is parallel to the second row.

9. The container of claim 1, wherein the first support frame and the second support frame are spaced from the at least one sidewall.

10. The container of claim 1, wherein the at least one sidewall is four sidewalls.

11. The container of claim 1, wherein the first support frame is directly over the second support frame.

12. The container of claim 1, wherein an upper surface of the first support frame directly contacts a lower surface of the upper plate.

13. The container of claim 12, wherein a lower surface of the second support frame directly contacts an upper surface of the lower plate.

* * * * *